Figure 1:
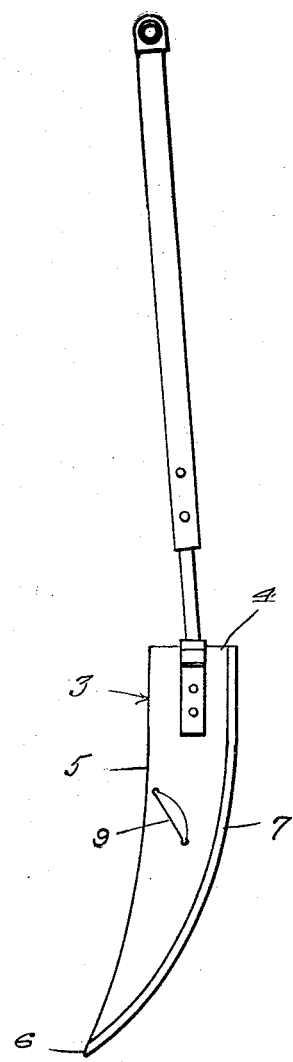

Oct. 6, 1931.    J. W. JENSEN    1,826,250
HAY KNIFE
Filed April 29, 1930

Inventor
Jens W. Jensen

By Clarence A. O'Brien
Attorney

Patented Oct. 6, 1931

1,826,250

UNITED STATES PATENT OFFICE

JENS W. JENSEN, OF FAIRFIELD, IDAHO

HAY KNIFE

Application filed April 29, 1930. Serial No. 448,286.

This invention relates to hay knives, and an object of the invention is to provide a hay knife for cutting through packed hay with ease and dispatch.

Further objects of the invention are to provide a hay knife of the character referred to that is strong, compact and durable, thoroughly reliable for its intended purpose, very simple in its method of assembly, and comparatively inexpensive to manufacture and use.

With the foregoing and other objects in view, the invention consists of a novel construction, combination and arrangement of parts, as will be hereinafter more specifically described and illustrated in the accompanying drawings, wherein is disclosed an embodiment of the invention, but it is to be understood that changes, variations and modifications may be resorted to without departing from the spirit of the claims hereto appended.

In the drawings wherein like reference characters denote corresponding parts throughout the several views:—

Figure 2:
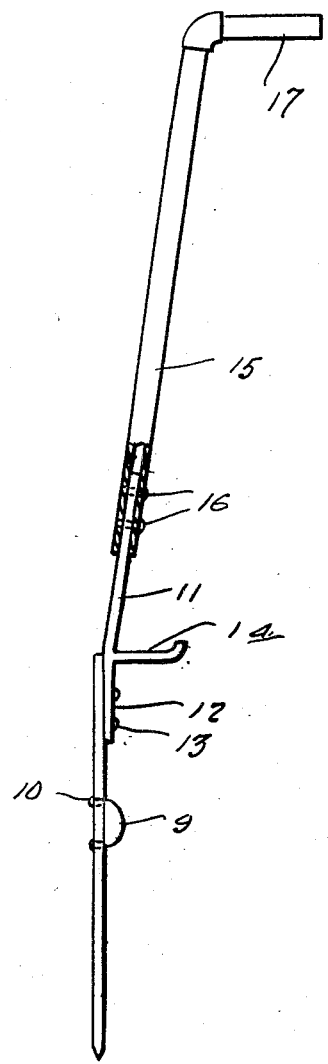

Figure 1 is a side elevation of the hay knife in accordance with the present invention, Fig. 2 is a top plan view thereof, partly in section.

In the drawings, wherein for the purpose of illustration is shown the preferred embodiment of my invention, 3 indicates generally the flat cutting blade of suitable thickness. The rear end of the blade terminates in a straight side 4. The upper edge 5 curves upwardly from the upper rear corner to the point 6.

The cutting edge 7 of the blade curves from the lower rear corner upwardly to the point 6, the point 6 being disposed laterally of the longitudinal median of the blade, so that when the point 6 is inserted in the hay and the handle swung forwardly and downwardly the blade will rock on the cutting edge as a fulcrum at the same time that it is cutting.

A segmental fin 9 projects laterally from one face of the blade, and has its flat edge secured to said face by means of rivets 10.

The fin 9 is disposed diagonally between the cutting edge 7 and the upper edge 5 and intermediate the ends of the blade.

An extension rod 11 has an arm 12 riveted to one face of the blade as at 13 and this arm 12, extends along the longitudinal median of the blade. Intermediate the ends of the extension 11, there is a lateral foot tread 14, formed therewith and this foot tread projects laterally from the rear end 4 of the blade.

A tubular handle 15 telescopes over the upper end of the extension 11 and is formed with a series of longitudinally spaced openings, through which extend the bolts 16 by which the handle 15 is detachably secured to the upper end of the extension.

Extra openings may be provided for adjusting the height of the handle with respect to the blade, but such openings are not shown. On the upper end the handle is formed with a lateral arm 17 that provides for gripping the knife while it is being forced into the hay. The extension 11 and handle 15 incline laterally from the blade 3.

Furthermore, the extension 11 and handle 15 incline upwardly from the longitudinal median of the blade.

In the application of the invention, the point 6 is driven into the haystack by the force of the foot bearing down on the tread 14. When the point 6 is forced as far as it will go into the hay stack in a vertical position, the handle 15 is swung forwardly and downwardly to cause the cutting edge of the blade to cut the hay. In the downward movement of the blade, the fin 9 will have its lower end enter the hay and the inclined rear face of the fin will crowd the blade forwardly into the hay and the penetration of the lower end of the fin into the hay will prevent the blade from slipping rearwardly during the cutting operation.

The present embodiment of the invention has been disclosed in considerable detail merely for the purpose of exemplification since in actual practice it attains the features of advantage enumerated as desirable in the statement of the invention and the above description.

It is to be understood that by describing in detail herein any particular form, or arrangement, it is not intended to limit the invention beyond the terms of the several claims, or the requirements of the prior art.

Having thus described my invention, what I claim as new is:—

1. A hay knife comprising a flat elongated blade having a point on one end disposed laterally of the longitudinal median of said blade, said blade further having a curved cutting edge coextensive with the length thereof, a lateral fin secured to one face of the blade intermediate the point and the end of the blade and above the cutting edge and said fin being inclined downwardly towards the cutting edge, and a handle connected with the blade.

2. A hay knife comprising a flat elongated blade having a point on one end disposed laterally of the longitudinal median of the said blade, said blade further having a curved cutting edge coextensive with the length thereof, a lateral fin secured to one face of the blade, a handle associated with the blade, a lateral tread on the handle, said fin being disposed intermediate the point and the end of the blade and above the cutting edge, said fin being inclined downwardly towards the cutting edge, said handle inclined outwardly from the plane of the blade and also inclining above the longitudinal median of the blade.

In testimony whereof I affix my signature.

JENS W. JENSEN.